(12) United States Patent
Zheng

(10) Patent No.: US 8,515,276 B2
(45) Date of Patent: Aug. 20, 2013

(54) METHOD, DEVICE AND SYSTEM FOR OPTICAL NETWORK SWITCHING PROTECTION

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 65 days.

(21) Appl. No.: 13/316,166

(22) Filed: Dec. 9, 2011

(65) Prior Publication Data

US 2012/0082449 A1    Apr. 5, 2012

Related U.S. Application Data

(63) Continuation of application No. PCT/CN2009/073532, filed on Aug. 26, 2009.

(51) Int. Cl.
*H04J 14/00* (2006.01)
*H04J 14/02* (2006.01)

(52) U.S. Cl.
CPC .................................. *H04J 14/0283* (2013.01)
USPC ...................... 398/5; 398/33; 398/58; 398/67

(58) Field of Classification Search
USPC .................. 398/5, 25, 33, 58, 66, 67, 165
See application file for complete search history.

(56) References Cited

U.S. PATENT DOCUMENTS

| | | | | |
|---|---|---|---|---|
| 6,771,908 | B2 * | 8/2004 | Eijk et al. | 398/66 |
| 2002/0071149 | A1 | 6/2002 | Xu et al. | |
| 2010/0166419 | A1 * | 7/2010 | Elmoalem et al. | 398/2 |
| 2012/0114333 | A1 * | 5/2012 | Zhang et al. | 398/58 |

FOREIGN PATENT DOCUMENTS

| | | |
|---|---|---|
| CN | 1479460 A | 3/2004 |
| CN | 1791039 A | 6/2006 |
| CN | 101378311 A | 3/2009 |
| CN | 101557539 A | 10/2009 |

OTHER PUBLICATIONS

Written Opinion of the International Searching Authority issued in corresponding PCT Patent Application No. PCT/CN2009/073532, mailed May 27, 2010.
International Search Report issued in corresponding PCT Patent Application No. PCT/CN2009/073532, mailed May 27, 2010.
Office Action issued in corresponding Chinese Patent Application No. 200980146906.1, mailed Oct. 8, 2012.

(Continued)

*Primary Examiner* — Dalzid Singh
(74) *Attorney, Agent, or Firm* — Brinks Hofer Gilson & Lione

(57) ABSTRACT

In the field of optical communications technologies, a method and a system for optical network switching protection are provided, to solve the problem of long service interruption time during active-standby switching in the prior art. One optical terminal apparatus is selected as a ranging optical terminal apparatus after a service is switched from an active optical central office end apparatus to a standby optical central office end apparatus; a delay difference between delay from the ranging optical terminal apparatus to the standby optical central office end apparatus and delay from the ranging optical terminal apparatus to the active optical central office end apparatus respectively is obtained; and time at which data sent by all the optical terminal apparatuses reaches the standby optical central office end apparatus is synchronized according to the delay difference. The method and the system are mainly used in an optical communication system.

15 Claims, 6 Drawing Sheets

(56) References Cited

OTHER PUBLICATIONS

Extended European Search Report issued in corresponding European Patent Application No. 09848615.2, mailed Mar. 26, 2012.
Huawei, "Solution of Fast GPON Switching in Long-Reach PON Scenario" International Telecommunication Union—Telecommunication Standardization Sector, COM 15-C254-E, Nov. 2008.
Editor, G.984.3, "Appendix XXX to G.984.3Am2 on Fast Switching" International Telecommunication Union—Telecommunication Standardization Sector, Study Group 15. TD 222 (WP1/15), Geneva, Sep. 28-Oct. 9, 2009.
Telecommunication Standardization Sector of ITU, "Gigabit-capable Passive Optical Networks (GPON): General Characteristics" Series G: Transmission Systems and Media, Digital Systems and Networks—Digital Sections and Digital Line System—Optical Line Systems for Local and Access Networks. G.984.1, Mar. 2008.

* cited by examiner

METHOD, DEVICE AND SYSTEM FOR OPTICAL NETWORK SWITCHING PROTECTION

CROSS-REFERENCE TO THE RELATED APPLICATIONS

This application is a continuation of International Application No. PCT/CN2009/073532, filed on Aug. 26, 2009, which is hereby incorporated by reference in its entirety.

FIELD

The present disclosure relates to the field of optical communications technologies, and in particular, to a method, a device and a system for optical network switching protection.

BACKGROUND

As shown in FIG. 1, a Passive Optical Network (PON) is mainly formed of Optical Line Terminations (OLTs), an optical splitter, Optical Network Units (ONUs)/Optical Network Terminals (ONTs) and optical fibres for connecting these apparatuses. Each OLT, as a central office end apparatus, is connected to the optical splitter through a backbone optical fibre, and the optical splitter is connected to each ONU through a single branch optical fibre. The PON supports fault protection for the backbone optical fibre and the OLT apparatus, and as shown in FIG. 1, two OLT apparatuses (an OLT1 and an OLT2) which are backups for each other are connected to the optical splitter through independent backbone optical fibres respectively. In a normal case, only an active OLT (the OLT1) communicates with the ONU through the active backbone optical fibre. When a system detects a port fault of the active OLT or a fault of the active backbone optical fibre, a service is switched to the standby OLT (the OLT2) to continue serving the ONU. The OLT1 and the OLT2 in FIG. 1 may be two independent OLT apparatuses, or may be different cards which are backups for each other but are integrated in the same apparatus.

In order to ensure that the OLT processes services of the ONUs synchronously, optical signals sent by all the ONUs are required to reach the OLT at the same time. However, distances from the ONUs to the optical fibre of the OLT are different, so corresponding time is required to be delayed when the ONU sends uplink data to the OLT according to the difference in distance from the ONUs to the OLT, and the delayed time is referred to as Equalization delay (EqD). The ONU may obtain the EqD through the following manner. First, the OLT performs ranging processing on each ONU, obtains Round trip delay (Rtd) from the OLT to each ONU, and calculates EqD of each ONU through the following formula: EqD=Teqd−Rtd, where Teqd is a constant denoting Equalized Rtd, and refers to an Rtd value of the furthest ONU under the OLT; and then sends the calculated EqD to the corresponding ONU. After receiving the EqD, the ONU sets its own EqD.

In the PON fault protection procedure, the inventor finds that the following problems exist in the current PON fault protection. When a service is required to be switched to the standby OLT due to a fault of the backbone optical fibre or a fault of the active OLT in the PON, since lengths of the active backbone optical fibre and the standby backbone optical fibre are different, EqD values of the ONUs after switching are also different, so that the standby OLT is required to perform ranging on all the ONUs again and set new EqD. As the ranging processing of the ONUs is performed serially, the OLT can start the ranging processing of a next ONU only after the ranging processing of a previous ONU is completed. Only after the ranging of all the ONUs is completed, service transmission between the ONU and the OLT can be restored. Therefore, interruption time caused by the fault protection is: service interruption time=Lost Of Signal (LOS) detection time+switching decision execution time+N×each ONU ranging time, where N is the number of ONUs accessing an OLT in a PON. If many ONUs access an OLT in a PON, service interruption time caused by fault protection is long, and service continuity cannot be ensured, which brings poor experience to a user, and reduces satisfaction of the user for services provided by an operator.

SUMMARY OF THE DISCLOSURE

Embodiments of the present disclosure provide a method, a device and a system for optical network switching protection, which are used to shorten service interruption time caused by fault protection.

In order to achieve the foregoing objectives, the embodiments of the present disclosure adopt the following technical solutions.

According to one aspect of the present disclosure, a method for optical network switching protection includes:

selecting one optical terminal apparatus as a ranging optical terminal apparatus after a service is switched from an active optical central office end apparatus to a standby optical central office end apparatus;

obtaining a delay difference between delay from the ranging optical terminal apparatus to the standby optical central office end apparatus and delay from the ranging optical terminal apparatus to the active optical central office end apparatus;

delivering the delay difference to all optical terminal apparatuses in a multicast manner, so that each optical terminal apparatus calculates Equalization delay (EqD) between the optical terminal apparatus and the standby optical central office end apparatus according to the delay difference respectively, and sets the calculated EqD; and synchronizing time at which data sent by all the optical terminal apparatuses reaches the standby optical central office end apparatus according to the delay difference.

According to another aspect of the present disclosure, a system for optical network switching protection includes an active optical central office end apparatus, a standby optical central office end apparatus and at least one optical terminal apparatus, in which the standby optical central office end apparatus is configured to select one of all optical terminal apparatuses as a ranging optical terminal apparatus after a service is switched from the active optical central office end apparatus to the standby optical central office end apparatus; and obtain a delay difference between delay from the ranging optical terminal apparatus to the standby optical central office end apparatus and delay from the ranging optical terminal apparatus to the active optical central office end apparatus; deliver the delay difference to all optical terminal apparatuses in a multicast manner; and synchronize time at which data sent by all the optical terminal apparatuses reaches the standby optical central office end apparatus according to the delay difference; and the optical terminal apparatus is configured to send data to the standby optical central office end apparatus after the service is switched from the active optical central office end apparatus to the standby optical central office end apparatus and calculate an Equalization delay (EqD) between the optical terminal apparatus and the standby optical central office end apparatus according to the delay difference respectively, and set the calculated EqD.

According to one aspect of the present disclosure, an optical central office end apparatus includes:

a selection unit, configured to select one of all optical terminal apparatuses as a ranging optical terminal apparatus after a service is switched from an active optical central office end apparatus to a standby optical central office end apparatus;

an obtaining unit, configured to obtain a delay difference between delay from the ranging optical terminal apparatus to the standby optical central office end apparatus and delay from the ranging optical terminal apparatus to the active optical central office end apparatus; and a synchronization unit, configured to synchronize time at which data sent by all the optical terminal apparatuses reaches the standby optical central office end apparatus according to the delay difference;

wherein the synchronization unit comprises:

a first sending module, configured to deliver the delay difference to all optical terminal apparatuses in a multicast manner; and instruct each optical terminal apparatus to calculate Equalization delay (EqD) between the optical terminal apparatus and the standby optical central office end apparatus according to the delay difference respectively, and set the calculated EqD.

In the method, the device and the system for optical network switching protection according to the embodiments of the present disclosure, after a service is switched to the standby optical central office end apparatus due to a fault of the backbone optical fibre or a fault of the active optical central office end apparatus, first, the ranging optical terminal apparatus is selected, the delay difference between the delay from the selected ranging optical terminal apparatus to the standby optical central office end apparatus and the delay from the ranging optical terminal apparatus to the active optical central office end apparatus is obtained, and then the time at which the data sent by all the optical terminal apparatuses reaches the standby optical central office end apparatus is synchronized according to the delay difference. In the embodiments of the present disclosure, when the delay difference is obtained, ranging is only required to be performed on the ranging optical terminal apparatus, so that the time for ranging is shortened, compared with the solution in the prior art that ranging is performed on all the optical terminal apparatuses again. Therefore, all the optical terminal apparatuses may quickly achieve synchronization under the standby optical central office end apparatus, so that service transmission between the optical terminal apparatuses and the optical central office end apparatus is easily restored, thereby shortening service interruption time caused by fault protection. Accordingly, service continuity is ensured, which brings good experience to a user, and improves satisfaction of the user for services provided by an operator.

BRIEF DESCRIPTION OF THE DRAWINGS

To illustrate the technical solutions according to the embodiments of the present disclosure or in the prior art more clearly, the accompanying drawings required for describing the embodiments or the prior art are introduced below briefly. Apparently, the accompanying drawings in the following descriptions merely show some of the embodiments of the present disclosure, and persons of ordinary skill in the art can obtain other drawings according to the accompanying drawings without creative efforts.

DETAILED DESCRIPTION OF THE EMBODIMENTS

Figure 1:
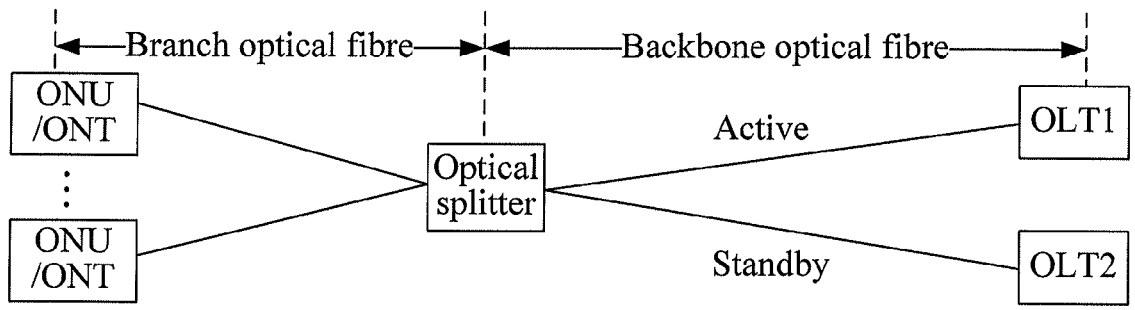
FIG. 1 is a topology principle diagram of a PON in the prior art.
Figure 2:
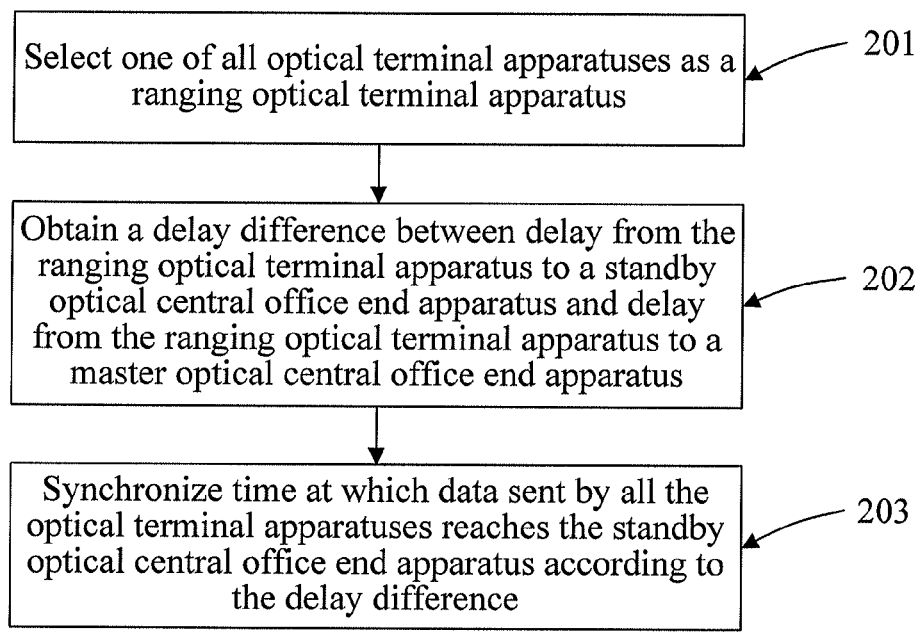
FIG. 2 is a flowchart of a method for optical network switching protection according to an embodiment of the present disclosure.

An embodiment of the present disclosure provides a method for optical network switching protection. As shown in FIG. 2, the method includes the following steps.

Step 201: If a fault occurs in an active optical central office end apparatus or a fault occurs in an active backbone optical fibre, a service is required to be switched to a standby optical central office end apparatus, so as to continue service provision. In this embodiment, one of all optical terminal apparatuses is selected as a ranging optical terminal apparatus after the service is switched to the standby optical central office end apparatus, in which the selected optical terminal apparatus may be any one of the optical terminal apparatuses under the standby optical central office end apparatus, or a specified optical terminal apparatus may be selected as the ranging optical terminal apparatus according to a predetermined rule.

For the switching in this embodiment, all physical ports of the entire active optical central office end apparatus may be switched to the standby optical central office end apparatus; or only a physical port where a fault occurs may be switched to a physical port of the standby optical central office end apparatus by the active optical central office end apparatus, and a physical port originally without any fault is still retained in the active optical central office end apparatus to operate normally.

Step 202: Obtain a delay difference between delay from the ranging optical terminal apparatus to the standby optical central office end apparatus and delay from the ranging optical terminal apparatus to the active optical central office end apparatus.

The delay difference may be an EqD difference or an Rtd difference.

Step 203: In order to ensure that the standby optical central office end apparatus processes services of the optical terminal apparatuses synchronously in the case that the standby optical central office end apparatus is employed, time at which data sent by all the optical terminal apparatuses reaches the standby optical central office end apparatus is synchronized according to the delay difference in this embodiment.

Figure 3:
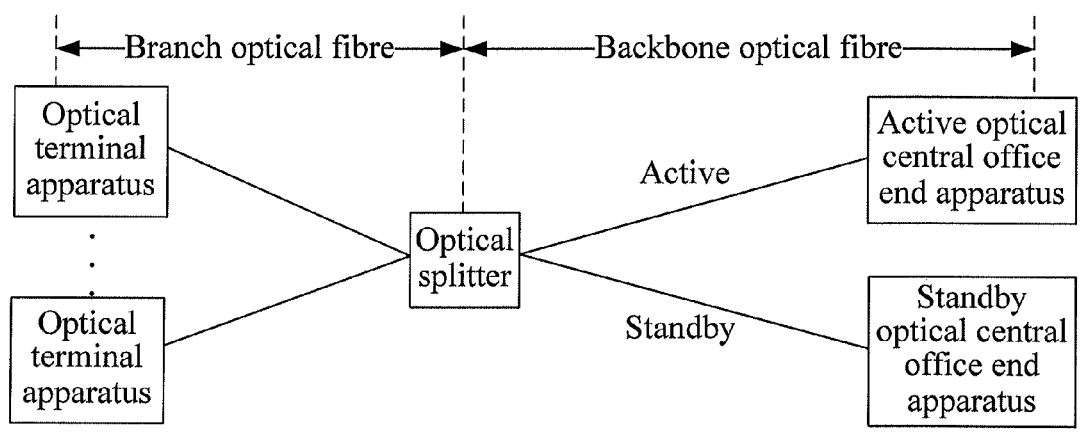
FIG. 3 is a block diagram of a system for optical network switching protection according to an embodiment of the present disclosure.

An embodiment of the present disclosure further provides a system for optical network switching protection. As shown in FIG. 3, the system includes an active optical central office end apparatus, a standby optical central office end apparatus and at least one optical terminal apparatus. The standby optical central office end apparatus is connected to an optical splitter through a backbone optical fibre, and each optical terminal apparatus is connected to the optical splitter through a branch optical fibre. In this embodiment, the standby optical central office end apparatus is configured to select one of all the optical terminal apparatuses as a ranging optical terminal apparatus after a service is switched from the active optical central office end apparatus to the standby optical central office end apparatus; obtain a delay difference between delay from the ranging optical terminal apparatus to the standby optical central office end apparatus and delay from the ranging optical terminal apparatus to the active optical central office end apparatus; and after obtaining the delay difference, adjust time at which data sent by all the optical terminal apparatus reaches the standby optical central office end apparatus according to the delay difference, so that the standby optical central office end apparatus processes services of the optical terminal apparatuses synchronously.

In order to make implementations of the embodiments of the present disclosure more comprehensible, the technical solutions in the embodiments of the present disclosure are clearly and completely illustrated in the following with reference to the accompanying drawings. It is obvious that the embodiments to be described are only a part rather than all of the embodiments of the present disclosure. All other embodiments obtained by persons of ordinary skill in the art based on the embodiments of the present disclosure without creative efforts shall fall within the protection scope of the present disclosure.

The following embodiments are applied to a system for optical network switching protection, the system includes an active optical central office end apparatus, a standby optical central office end apparatus and at least one optical terminal apparatus, and the system shortens service interruption time caused by active-standby switching by performing methods in the following embodiments. For convenience of description, the following embodiments all adopt an OLT to achieve a function of an optical central office end apparatus, and adopt an ONU to achieve a function of an optical terminal apparatus, and in practical use, the above functions may also be achieved by other apparatuses.

Embodiment 1

This embodiment provides a method for optical network switching protection. After a service is switched from an active OLT to a standby OLT, the standby OLT selects a special ONU (referred to as a ranging ONU) from ONUs, and obtains first Rtd of the ranging ONU under the active OLT and second Rtd of the ranging ONU under the standby OLT; and then obtains an Rtd difference ΔRtd according to the first Rtd and the second Rtd of the ranging ONU, and delivers the ΔRtd to all the ONUs in a multicast/broadcast manner, so that the ONUs each calculate EqD under the standby OLT. Definitely, in the protection method of this embodiment, the standby OLT may further calculate second EqD of the ranging ONU under the standby OLT after detecting the second Rtd; and finally calculate an EqD difference ΔEqD, and deliver the ΔEqD to all the ONUs in a multicast/broadcast manner, so that the ONUs each calculate the EqD under the standby OLT.

In order to enable each ONU to calculate the EqD under the standby OLT by utilizing the ΔRtd, in this embodiment, when the ΔRtd is delivered to all the ONUs in the multicast/broadcast manner, and if first Teqd under the active OLT is equal to second Teqd under the standby OLT, the EqD under the standby OLT may be directly calculated by utilizing the ΔRtd; and if the first Teqd under the active OLT is not equal to the second Teqd under the standby OLT, the first Teqd under the active OLT and the second Teqd under the standby OLT are required to be delivered to all the ONUs in a multicast/broadcast manner simultaneously.

Figure 4:
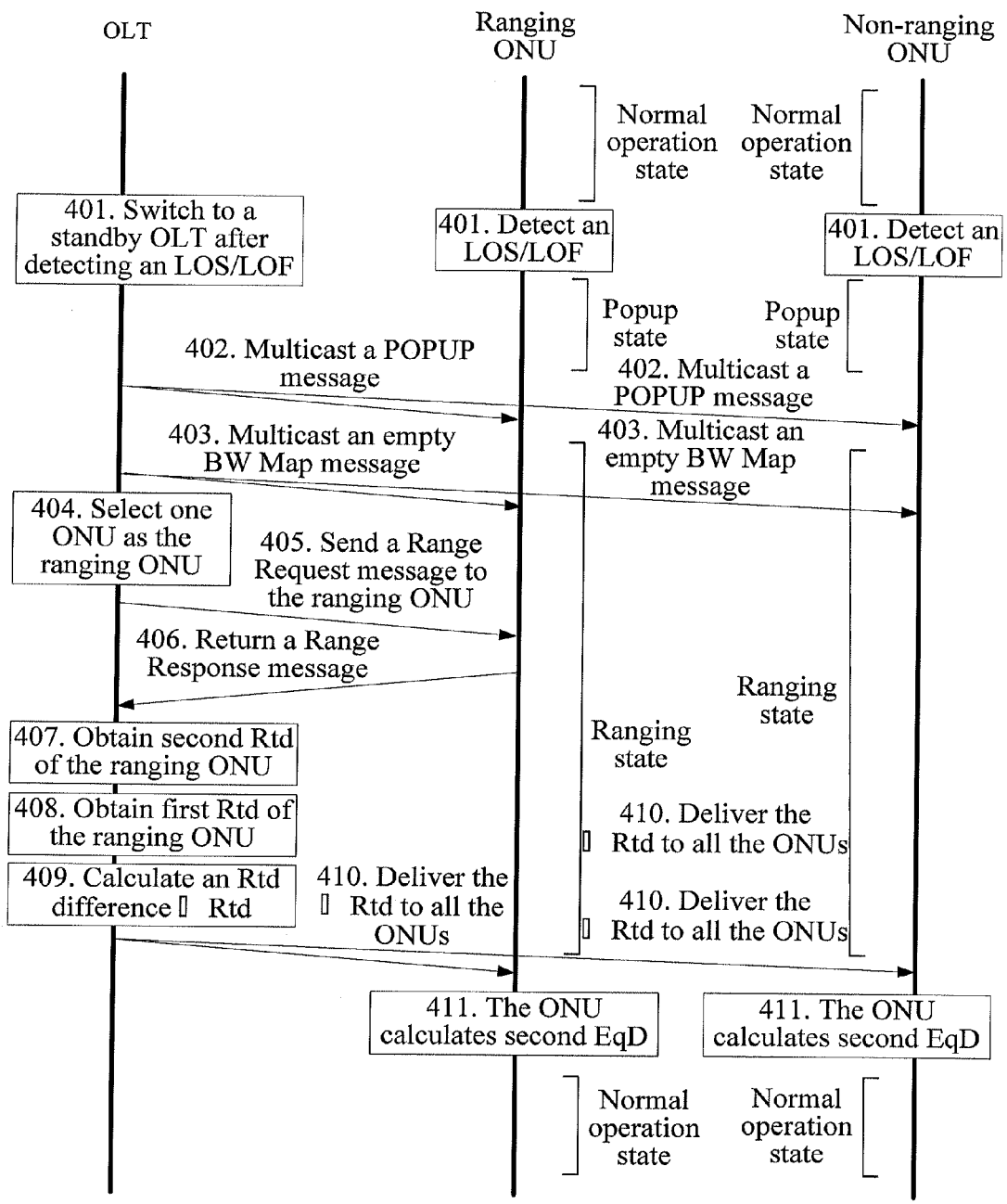
FIG. 4 is a flowchart of a method for optical network switching protection according to Embodiment 1 of the present disclosure.

Specifically, referring to FIG. 4, the active OLT, the standby OLT and two of multiple ONUs are shown, and in practice, the system may include more than two ONUs (the other ONUs are not shown). The specific implementation procedure of the method is as follows.

Step 401: After a fault occurs in a backbone optical fibre of the active OLT, the active OLT and each ONU cannot receive signals from each other, and may both detect an LOS or a Lost of Frame (LOF) alarm. The active OLT detects the LOS/LOF alarm, knows that a fault occurs in the active backbone optical fibre, and active-standby OLT switching is required to be performed, that is, the master OLT switches a service of an accessing ONU to the standby OLT, and communicates with each ONU through the standby backbone optical fibre provided by the standby OLT (in this case, the active OLT is converted into the standby OLT, and the original standby OLT is converted into a new active OLT; herein, for convenience of description, the name of each OLT is not altered). After detecting the LOS alarm, each ONU apparatus is switched from a normal operation state (OPERATION) to a popup state (POPUP). In this case, service transmission between the standby OLT and each ONU is in an interruption state.

Step 402: The standby OLT multicasts a POPUP message to each ONU, so that all the ONUs enter a Ranging state, and in an optical network, the Ranging state of an ONU is mainly used for ranging.

Step 403: The standby OLT multicasts an empty BW Map message to each ONU, so as to stop all the ONUs from sending data to the standby OLT, and avoid interference on a subsequent ranging procedure for the ONU.

Step 404: The standby OLT selects one of the accessing ONUs as the ranging ONU. In practical application, the standby OLT may select any one of the accessing ONUs as the ranging ONU, or may specify one of the accessing ONUs as the ranging ONU according to a preset rule.

Step 405: The standby OLT sends a Range Request message to the selected ranging ONU, and starts a ranging timer, so as to perform ranging on the ranging ONU.

Step 406: After receiving the Range Request message, the ranging ONU returns a Range Response message to the standby OLT, in which the Range Response message is generally implemented through a Serial_Number_ONU PLOAM message in the optical network.

Step 407: The standby OLT receives the Range Response message, stops the ranging timer, and obtains the second Rtd of the ranging ONU under the standby OLT from the ranging timer.

Step 408: The standby OLT obtains the first Rtd of the ranging ONU under the active OLT from the active OLT.

The step that the standby OLT obtains the first Rtd is unnecessarily performed at this time. Since the first Rtd is pre-stored by the active OLT, the step may be performed at any time after step 401, or may be performed at any time before step 401; for example, when a PON system is deployed, parameters of the accessing ONUs are configured and pre-stored in the active OLT and the standby OLT respectively. The embodiment of the present disclosure does not limit the specific manner and time of obtaining the parameters of the accessing ONUs by the standby OLT, but it is required to ensure that before step 409 is performed, the standby OLT successfully obtains parameters of the ranging ONU.

Step 409: The standby OLT calculates the Rtd difference ΔRtd according to the first Rtd and the second Rtd of the ranging ONU.

Step 410: The standby OLT delivers the ΔRtd to all the ONUs in a multicast/broadcast/unicast manner, in which multicast/broadcast is an optimal solution, while unicast is a sub-optimal solution.

In practical application, step 407 to step 410 may be replaced with the following steps.

Step 407': Calculate the corresponding second EqD of the ranging ONU under the standby OLT according to the second Rtd of the ranging ONU. Specific calculation is as follows: the second Rtd is subtracted from the second Teqd under the standby OLT to obtain the second EqD.

Step 408': The standby OLT obtains the first EqD of the ranging ONU under the active OLT from the active OLT.

Step 409': The standby OLT calculates the EqD difference ΔEqD according to the first EqD and the second EqD of the ranging ONU.

Step 410': The standby OLT delivers the ΔEqD to all the ONUs in a multicast/broadcast/unicast manner, in which multicast/broadcast is an optimal solution, while unicast is a sub-optimal solution.

It can be seen from the description of the foregoing embodiment that, finally, the standby OLT needs to deliver the ΔRtd or ΔEqD to all the ONUs in a multicast/broadcast manner, and the specific manner may include delivering the ΔRtd or ΔEqD by adopting a broadcast Physical Layer Operation Administration Maintenance (PLOAM) message; or delivering the ΔRtd/ΔEqD by adopting a specific Multicast Gigabit PON Encapsulation Method (GEM) Port, that is, deliver the PLOAM message carrying the ΔRtd/ΔEqD to the ONU through the specific Multicast GEM Port.

The format of the PLOAM message of the ΔRtd/ΔEqD delivered through multicast is defined as follows:

| No. | Content | Description |
| --- | --- | --- |
| 1 | 11111111 | Denote an ID of an ONU, that is, a message sent to an ONU corresponding to a specified ID or a message sent to all the ONUs. When a message is multicast to all the ONUs, the ID of the ONU is denoted by 0xFF. |
| 2 | 00011110 or 00011111 | 00011110 indicates that the message type is the multicast delivered ΔRtd. 00011111 indicates that the message type is the multicast delivered ΔEqD. |
| 3-6 | xxxxxxxx | ΔRtd/ΔEqD value |
| 7-12 | Not stipulated | Reserved |

After the foregoing process is completed, the method in this embodiment is further required to perform the following procedures.

Step 411: After the process, each ONU receives the ΔRtd or ΔEqD. If the ONU receives the ΔEqD, the ONU calculates the second EqD of the ONU under the standby OLT according to the ΔEqD and the first EqD of the ONU (that is, the EqD under the active OLT), in which the calculation formula is: second EqD=first EqD+ΔEqD.

If the ONU receives the ΔRtd, each ONU obtains the second EqD of the ONU under the standby OLT according to the first EqD of the ONU (that is, the EqD under the active OLT) and the Rtd difference ΔRtd, in which the calculation formula is: second EqD=first EqD+(second Teqd−first Teqd+ΔRtd). Therefore, if the second Teqd is not equal to the first Teqd, the standby OLT is required to deliver the second Teqd and the first Teqd to each ONU in the broadcast/multicast manner.

Generally, the second Teqd and the first Teqd may be pre-configured in the standby OLT, or may be obtained by the standby OLT from the active OLT.

The first Teqd is a constant value, and is an Rtd value under the active OLT when EqD=0, that is, an Rtd value of the furthest ONU under the active OLT. The second Teqd is also a constant value, and is an Rtd value under the standby OLT when EqD=0, that is, an Rtd value of the furthest ONU under the standby OLT. If the second Teqd is equal to the first Teqd, a second EqD value=the first EqD value+ΔRtd, and in this case, the second Teqd and the first Teqd are not required to be delivered.

After all the ONUs obtain the EqD under the standby OLT and complete EqD setting, the service transmission between the standby OLT and the ONU accessing the standby OLT can be restored.

After the embodiment of the present disclosure is adopted, when the active OLT and the standby OLT are switched, service interruption time=LOS detection time+switching decision execution time+1×ONU ranging time, where the 1×ONU ranging time refers to a period of time from the moment at which the standby OLT sends the Range Request message to the ranging ONU to the moment at which the standby OLT calculates the Rtd, and the time is about 0.6 ms; and the 1×ONU ranging time further includes time for notifying of delivering the ΔRtd or ΔEqD to all the ONUs in the multicast/broadcast manner, and the time is about 0.4 ms, so that the entire ranging time is about 1 ms.

The LOS detection time is less than 1 ms, the switching decision execution time may also be within 1 ms, and both are less than 2 ms. Therefore, it can be seen that, the service interruption time in the embodiment of the present disclosure at most requires 3 ms, and can fully satisfy the requirement that the service interruption time is less than 50 ms.

However, the service interruption time in the prior art is: service interruption time=LOS detection time+switching decision execution time+N×ONU ranging time, where N is the number of ONUs accessing a PON OLT.

It can be seen according to the formula of the service interruption time that, time for performing ranging on an ONU again directly constrains the service interruption time. It can be known from the above description that, time for performing ranging on each ONU is about 1 ms. The more the number of ONUs accessing a PON port is, the longer the interruption time of a bearer service after active-standby OLT switching is. Generally, the service interruption time caused by active-standby switching is required to be less than 50 ms, and if 64 or more ONUs access a PON port, the service interruption time greatly exceeds the requirement of 50 ms. Moreover, capacity expansion is an inevitable trend for PON development, and as the number of ONUs accessing a PON is greatly increased, when ranging is required to be performed again in the service operation procedure, for services with high service delay requirements, such as a TDM (Time Division Multiplex, time division multiplex) voice service and a video service, the switching protection method in the prior art cannot satisfy their delay requirements.

However, after the embodiment of the present disclosure is adopted, the service interruption time caused in the switching protection procedure can be controlled about 3 ms, thereby satisfying the requirement of the service interruption time being less than 50 ms, and being applicable to multiple services with high service delay requirements.

Embodiment 2

This embodiment provides a method for optical network switching protection. After a service is switched from an active OLT to a standby OLT, the standby OLT first selects a special ONU (referred to as a ranging ONU) from ONUs, and obtains first Rtd of the ranging ONU under the active OLT and second Rtd of the ranging ONU under the standby OLT; and then obtains an Rtd difference ΔRtd according to the first Rtd and the second Rtd of the ranging ONU, and instructs all the ONUs to maintain the original EqD unchanged in a multicast/broadcast/unicast manner. The standby OLT adjusts start time of an uplink frame header of each ONU according to the ΔRtd. Definitely, in the protection method of this embodiment, the standby OLT may further calculate second EqD of the ranging ONU under the standby OLT after detecting the second Rtd; and finally calculate an EqD difference ΔEqD, and instruct all the ONUs to maintain the original EqD unchanged in a multicast/broadcast/unicast manner. The standby OLT adjusts the start time of an uplink frame header of each ONU according to the ΔEqD.

When all the ONUs are instructed to maintain the original EqD unchanged, first EqD of each ONU under the active OLT may be required to be delivered to the ONU through multicast/broadcast/unicast. Therefore, the first EqD of each ONU under the active OLT is required to be obtained additionally; or the first Rtd of each ONU under the active OLT is obtained additionally, and then the corresponding first EqD is calculated by utilizing the first Rtd.

Figure 5:
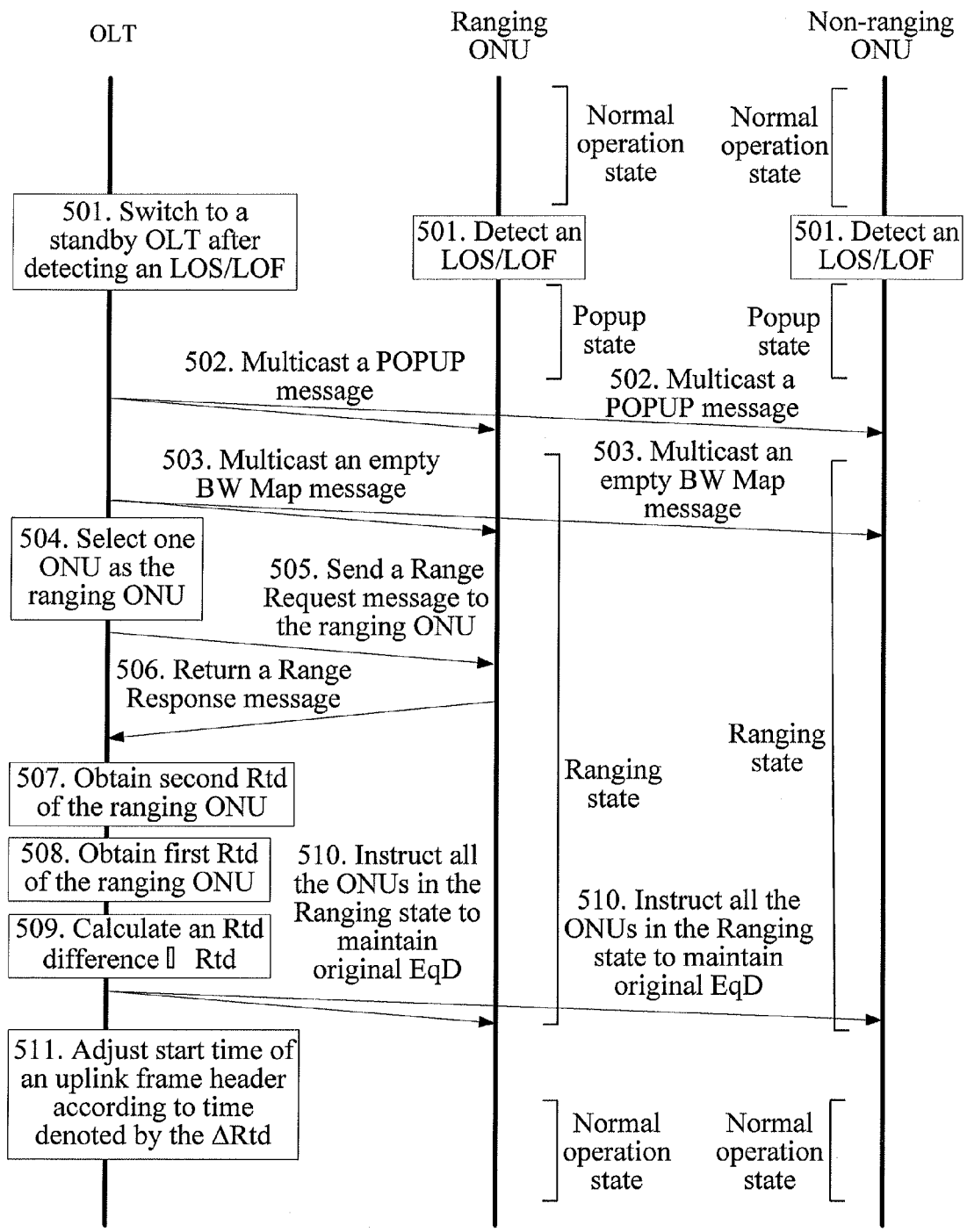
FIG. 5 is a flowchart of a method for optical network switching protection according to Embodiment 2 of the present disclosure.

Specifically, referring to FIG. 5, the active OLT, the standby OLT and two of multiple ONUs are shown, and in practice, the system may include more than two ONUs (the other ONUs are not shown). The specific implementation procedure of the method is as follows.

Step 501: After a fault occurs in a backbone optical fibre of the active OLT, the active OLT and each ONU cannot receive signals from each other, and may both detect an LOS or LOF alarm. The active OLT detects the LOS/LOF alarm, knows that a fault occurs in the active backbone optical fibre, and active-standby OLT switching is required to be performed, that is, the active OLT switches a service of an accessing ONU to the standby OLT, and communicates with each ONU through the standby backbone optical fibre provided by the standby OLT (in this case, the active OLT is converted into the standby OLT, and the original standby OLT is converted into a new active OLT; herein, for convenience of description, the name of each OLT is not altered). After detecting the LOS alarm, each ONU apparatus is switched from a normal operation state (OPERATION) to a popup state (POPUP). In this case, service transmission between the standby OLT and each ONU is in an interruption state.

Step 502: The standby OLT multicasts a POPUP message to each ONU, so that all the ONUs enter a Ranging state, and in an optical network, the Ranging state of an ONU is mainly used for ranging.

Step 503: The standby OLT multicasts an empty BW Map message to each ONU, so as to stop all the ONUs from sending data to the standby OLT, and avoid interference on a subsequent ranging procedure for the ONU.

Step 504: The standby OLT selects one of the accessing ONUs as the ranging ONU. In practical application, the standby OLT may select any one of all the accessing ONUs as the ranging ONU, or may specify one of the accessing ONUs as the ranging ONU according to a preset rule.

Step 505: The standby OLT sends a Range Request message to the selected ranging ONU, and starts a ranging timer, so as to perform ranging on the ranging ONU.

Step 506: After receiving the Range Request message, the ranging ONU returns a Range Response message to the standby OLT, in which the Range Response message is generally implemented through a Serial_Number_ONU PLOAM message in the optical network.

Step 507: The standby OLT receives the Range Response message, stops the ranging timer, and obtains the second Rtd of the ranging ONU under the standby OLT from the ranging timer.

Step 508: The standby OLT obtains the first Rtd of the ranging ONU under the active OLT from the active OLT.

The step that the standby OLT obtains the first Rtd is unnecessarily performed at this time. Since the first Rtd is pre-stored by the active OLT, the step may be performed at any time after step 501, or may be performed at any time before step 501; for example, when a PON system is deployed, parameters of the accessing ONUs are configured and pre-stored in the active OLT and the standby OLT respectively. The embodiment of the present disclosure does not limit the specific manner and time of obtaining the parameters of the accessing ONUs by the standby OLT, but it is required to ensure that before step 509 is performed, the standby OLT successfully obtains parameters of the ranging ONU.

Step 509: The standby OLT calculates the Rtd difference ΔRtd according to the first Rtd and the second Rtd of the ranging ONU.

Step 510: The standby OLT instructs all the ONUs in the Ranging state to maintain the original EqD value, so that each ONU exits the Ranging state, and enters the Operation state. Then, step 511 is performed.

Step 511: The standby OLT adjusts start time of a subsequent uplink frame header of each ONU according to time denoted by the ΔRtd.

Specific implementation of step 510 in the embodiment of the present disclosure may adopt, but not limited to, any one of the following manners:

First manner: an existing unicast Ranging_Time PLOAM message is modified into a multicast Ranging_Time PLOAM message, and then all the ONUs are notified of maintaining the original EqD value in the multicast manner by utilizing the modified message. The format of the modified Ranging_Time PLOAM message is defined as follows:

| No. | Content | Description |
|---|---|---|
| 1 | ONU ID or 11111111 | Denote an ID of an ONU, that is, a message sent to an ONU corresponding to a specified ID or a message sent to all the ONUs. When a message is multicast to all the ONUs, the ID of the ONU is denoted by 0xFF. |
| 2 | 00000100 | Indicate that the message type is "Ranging_Time" |
| 3 | 00000000 or 00000001 or 00000011 | 00000000 indicates that an EqD value of an active link is carried. 00000001 indicates that an EqD value of a standby link is carried. 00000011 indicates that an existing EqD value is maintained. |
| 4-7 | xxxxxxxx | EqD value |
| 8-12 | Not stipulated | Reserved |

Second manner: an existing unicast Ranging_Time PLOAM message is modified into a multicast Ranging_Time PLOAM message, and the modified multicast Ranging_Time PLOAM message is delivered by adopting a specific Multicast GEM Port.

Third manner: if the standby OLT obtains the first EqD of each ONU under the active OLT in advance, in step 510, the standby OLT may bear a unicast Ranging_Time PLOAM message delivered to each ONU by adopting a specific Multicast GEM Port, and each unicast Ranging_Time PLOAM message carries corresponding first EqD, so as to ensure that all the ONUs maintain the first EqD.

Fourth manner: if the standby OLT obtains the first EqD of each ONU under the active OLT in advance, the standby OLT delivers the first EqD to a corresponding ONU through an existing unicast Ranging_Time PLOAM message in a unicast manner in step 510, so as to ensure that all the ONUs maintain the first EqD.

In the third and the fourth manner, the first EqD to be used may actually be calculated in the following manner: first, the standby OLT obtains the first Rtd of each ONU under the active OLT in advance, then calculates the first EqD of each ONU under the active OLT by utilizing the first Rtd, and instructs all the ONUs in the Ranging state to maintain the original EqD value according to the third or fourth manner respectively.

In practical application, step 507 to step 511 may be replaced with the following steps.

Step 507': Calculate the corresponding second EqD of the ranging ONU under the standby OLT according to the second Rtd of the ranging ONU. Specific calculation is as follows: the second Rtd is subtracted from the second Teqd under the standby OLT to obtain the second EqD.

Step 508': The standby OLT obtains the first EqD of the ranging ONU under the active OLT from the active OLT.

Step 509': The standby OLT calculates the EqD difference ΔEqD according to the first EqD and the second EqD of the ranging ONU.

Step 510': The standby OLT instructs all the ONUs in the Ranging state to maintain the original EqD value, so that the ONU exits the Ranging state, and enters the Operation state. Then, step 511' is performed.

Step 511': The standby OLT adjusts start time of a subsequent uplink frame header according to time denoted by the ΔEqD.

After all the ONUs receive the instruction of maintaining the original EqD unchanged delivered by the standby OLT, the service transmission between the standby OLT and the ONU accessing the standby OLT can be restored.

After the embodiment of the present disclosure is adopted, when the active OLT and the standby OLT are switched, and if the standby OLT instructs all the ONUs to maintain the EqD unchanged in the multicast/broadcast manner, service interruption time=LOS detection time+switching decision execution time+1×ONU ranging time+EqD multicast notification time, where the 1×ONU ranging time refers to a period of time from the moment at which the standby OLT sends the Range Request message to the ranging ONU to the moment at which the standby OLT calculates the Rtd, and the time is about 0.6 ms; and the EqD multicast notification time is about 0.4 ms, so that 1×ONU ranging time+EqD multicast notification time is about 1 ms. The LOS detection time is less than 1 ms, the switching decision execution time may also be within 1 ms, and both are less than 2 ms. Therefore, it can be seen that, the service interruption time in the embodiment of the present disclosure at most requires 3 ms, and can fully satisfy the requirement that the service interruption time is less than 50 ms.

However, the service interruption time in the prior art is: service interruption time=LOS detection time+switching decision execution time+N×ONU ranging time, where N is the number of ONUs accessing a PON OLT.

It can be seen according to the formula of the service interruption time that, time for performing ranging on an ONU again directly constrains the service interruption time. It can be known from the above description that, time for performing ranging on each ONU is about 1 ms. The more the number of ONUs accessing a PON port is, the longer the interruption time of a bearer service after active-standby OLT switching is. Generally, the service interruption time caused by active-standby switching is required to be less than 50 ms, and if 64 or more ONUs access a PON port, the service interruption time greatly exceeds the requirement of 50 ms. Moreover, capacity expansion is an inevitable trend for PON development, and as the number of ONUs accessing a PON is greatly increased, when ranging is required to be performed again in the service operation procedure, for services with high service delay requirements, such as a TDM (Time Division Multiplex, time division multiplex) voice service and a video service, the switching protection method in the prior art cannot satisfy their delay requirements.

However, after the embodiment of the present disclosure is adopted, the service interruption time caused in the switching protection procedure may be controlled about 3 ms, thereby satisfying the requirement of the service interruption time being less than 50 ms, and being applicable to multiple services with high service delay requirements.

If the standby OLT instructs all the ONUs to maintain the EqD unchanged in the unicast manner, service interruption time=LOS detection time+switching decision execution time+1×ONU ranging time+(N−1)×EqD unicast serial notification time, where the 1×ONU ranging time includes a period of time from the moment at which the standby OLT sends the Range Request message to the ranging ONU to the moment at which the standby OLT calculates the Rtd, and the time is about 0.6 ms; time for notifying one of the ONUs of maintaining the EqD in unicast is about 0.4 ms, plus the foregoing 0.6 ms, and is about 1 ms in total. Then, each of the remaining (N−1) ONUs is further notified of maintaining the EqD in the unicast manner, and the used time is about (N−1)× 0.4 ms, so that the finally used time is still shorter than that in the prior art. Compared with the multicast/broadcast manner, the service interruption time is longer, so the unicast manner is a sub-optimal solution.

Embodiment 3

This embodiment provides a method for optical network switching protection. After a service is switched from an active OLT to a standby OLT, the standby OLT first selects a special ONU (referred to as a ranging ONU) from ONUs, and obtains first Rtd of the ranging ONU under the active OLT and second Rtd of the ranging ONU under the standby OLT; then obtains an Rtd difference ΔRtd according to the first Rtd and the second Rtd of the ranging ONU, and obtains first Rtd of each ONU under the active OLT; and subsequently, calculates second EqD of each ONU under the standby OLT according to the first Rtd and ΔRtd, in which the calculation formula is: second Teqd−(first Rtd−ΔRtd). The second Teqd is a constant value, and is an Rtd value under the standby OLT when EqD=0, that is, an Rtd value of the furthest ONU under the standby OLT. The finally calculated second EqD is delivered to each ONU in a multicast/broadcast manner.

Figure 6:
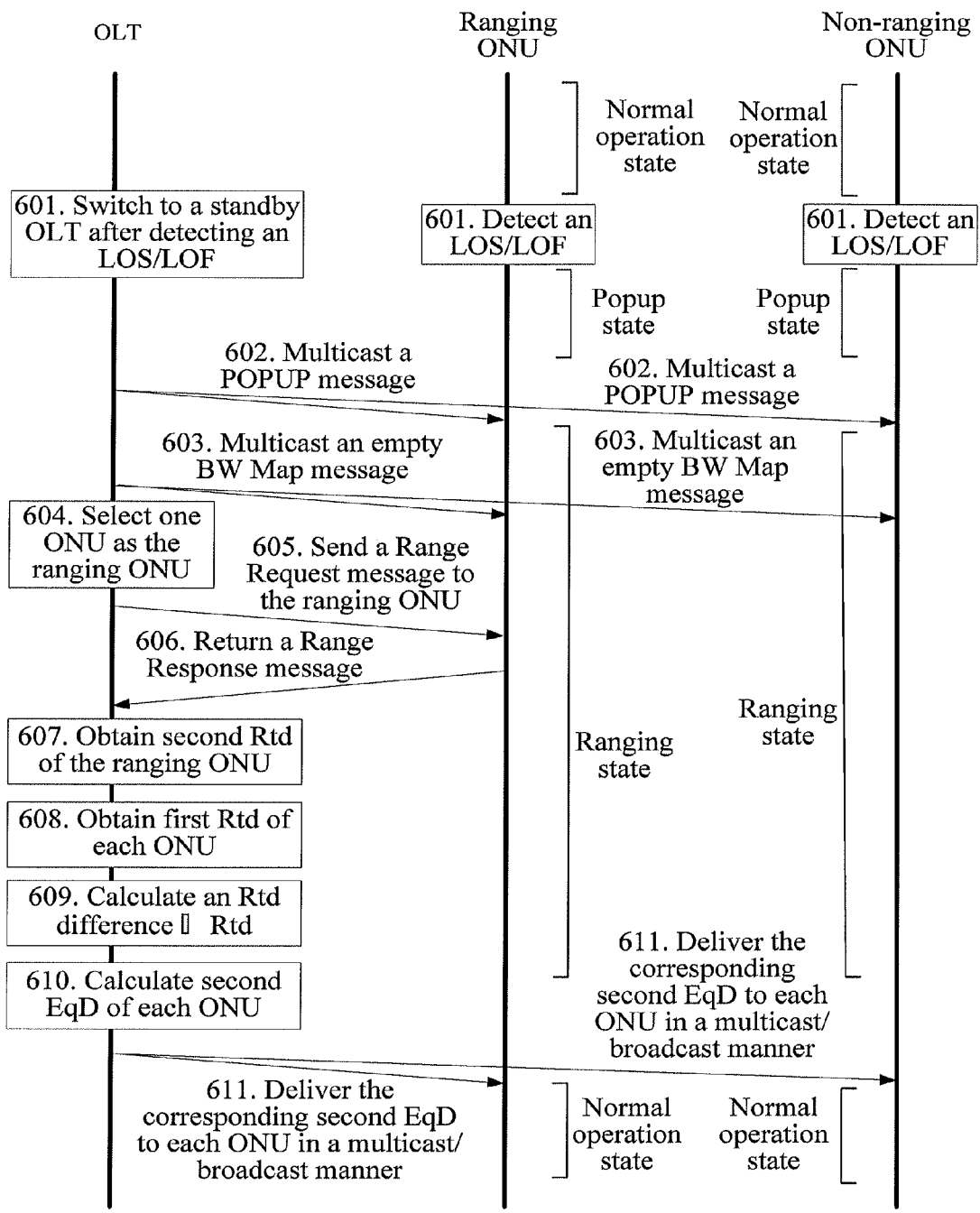
FIG. 6 is a flowchart of a method for optical network switching protection according to Embodiment 3 of the present disclosure.

Specifically, referring to FIG. 6, the active OLT, the standby OLT and two of multiple ONUs are shown, and in practice, the system may include more than two ONUs (the other ONUs are not shown). The specific implementation procedure of the method is as follows.

Step 601: After a fault occurs in a backbone optical fibre of the active OLT, the active OLT and each ONU cannot receive signals from each other, and may both detect an LOS or LOF alarm. The active OLT detects the LOS/LOF alarm, knows that a fault occurs in the active backbone optical fibre, and active-standby OLT switching is required to be performed, that is, the active OLT switches a service of an accessing ONU to the standby OLT, and communicates with each ONU through the standby backbone optical fibre provided by the standby OLT (in this case, the active OLT is converted into the standby OLT, and the original standby OLT is converted into a new active OLT; herein, for convenience of description, the name of each OLT is not changed). After detecting the LOS alarm, each ONU apparatus is switched from a normal operation state (OPERATION) to a popup state (POPUP). In this case, service transmission between the standby OLT and each ONU is in an interruption state.

Step 602: The standby OLT multicasts a POPUP message to each ONU, so that all the ONUs enter a Ranging state, and in an optical network, the Ranging state of an ONU is mainly used for ranging.

Step 603: The standby OLT multicasts an empty BW Map message to each ONU, so as to stop all the ONUs from sending data to the standby OLT, and avoid interference on a subsequent ranging procedure for the ONU.

Step 604: The standby OLT selects one of the accessing ONUs as the ranging ONU. In practical application, the standby OLT may select any one of all the accessing ONUs as the ranging ONU, or may specify one of the accessing ONUs as the ranging ONU according to a preset rule.

Step 605: The standby OLT sends a Range Request message to the selected ranging ONU, and starts a ranging timer, so as to perform ranging on the ranging ONU.

Step 606: After receiving the Range Request message, the ranging ONU returns a Range Response message to the standby OLT, in which the Range Response message is generally implemented through a Serial_Number_ONU PLOAM message in the optical network.

Step 607: The standby OLT receives the Range Response message, stops the ranging timer, and obtains the second Rtd of the ranging ONU under the standby OLT from the ranging timer.

Step 608: The standby OLT obtains the first Rtd of the ranging ONU under the active OLT from the active OLT, and obtains the first Rtd of each ONU under the active OLT.

The step that the standby OLT obtains the first Rtd is unnecessarily performed at this time. Since the first Rtd is pre-stored by the active OLT, the step may be performed at any time after step 601, or may be performed at any time before step 601; for example, when a PON system is deployed, parameters of the accessing ONUs are configured and pre-stored in the active OLT and the standby OLT respectively. The embodiment of the present disclosure does not limit the specific manner and time of obtaining the parameters of the accessing ONUs by the standby OLT, but it is required to ensure that before step 609 is performed, the standby OLT successfully obtains parameters of the ranging ONU.

Step 609: The standby OLT calculates the Rtd difference ΔRtd according to the first Rtd and the second Rtd of the ranging ONU.

Step 610: The standby OLT calculates the second EqD of each ONU under the standby OLT according to the ΔRtd and the first Rtd of each ONU; and the specific calculation formula is: second EqD=second Teqd−(first Rtd−ΔRtd). The second Teqd is a constant value, and is an Rtd value under the standby OLT when EqD=0, that is, an Rtd value of the furthest ONU under the standby OLT.

The deduction principle of the calculation formula is as follows.

Tpd is used to denote optical fibre propagation delay, and for an ONU/ONT, Tpd=branch optical fibre propagation delay value+backbone optical fibre propagation delay value; Tpd of the same ONU to the active OLT and the standby OLT is the same at a branch optical fibre segment, and at a backbone optical fibre segment, because of different distances, the backbone optical fibre propagation delay is different; and an Rtd difference of an $n^{th}$ ONU/ONT on the active OLT and the standby OLT is a delay difference ΔRtd of the same ONUn between the active backbone optical fibre propagation delay and the standby backbone optical fibre propagation delay, that is:

ΔRtd(n)=Rtd(active,n)−Rtd(standby,n), and ΔRtd=ΔRtd(1)=ΔRtd(2)= . . . =ΔRtd(n)=fixed value.

When the $n^{th}$ ONU/ONT is switched from the active OLT to the standby OLT, EqD (standby, n) of the ONU (n) under the standby OLT=Teqd (standby)−Rtd (standby, n)=Teqd (standby)−[Rtd (active, n)−ΔRtd].

Step 611: The standby OLT delivers second EqD corresponding to all the ONUs to all the ONUs in one time in a multicast/broadcast manner, and each ONU extracts the corresponding second EqD from a multicast/broadcast message respectively. After all the ONUs obtain the EqD under the standby OLT and complete EqD setting, the service transmission between the standby OLT and the ONU accessing the standby OLT can be restored.

The standby OLT bears a unicast Ranging_Time PLOAM message delivered to each ONU by adopting a specific Multicast GEM Port, each unicast Ranging_Time PLOAM message carries a second EqD value to an ONU corresponding to an ONU ID; and the ONU may obtain the second EqD value carried by the corresponding Ranging_Time PLOAM message according to the ONU ID in the Ranging_Time PLOAM message.

After the embodiment of the present disclosure is adopted, when the active OLT and the standby OLT are switched, service interruption time=LOS detection time+switching decision execution time+1×ONU ranging time, where the 1×ONU ranging time refers to a period of time from the moment at which the standby OLT sends the Range Request message to the ranging ONU to the moment at which the standby OLT calculates the Rtd, and the time is about 0.6 ms; and the 1×ONU ranging time further includes time for notifying of delivering the second EqD to all the ONUs in the multicast/broadcast manner, and the time is about 0.4 ms, so that the entire ranging time is about 1 ms.

The LOS detection time is less than 1 ms, the switching decision execution time may also be within 1 ms, and both are less than 2 ms. Therefore, it can be seen that, the service interruption time in the embodiment of the present disclosure at most requires 3 ms, and can fully satisfy the requirement that the service interruption time is less than 50 ms.

However, the service interruption time in the prior art is: service interruption time=LOS detection time+switching decision execution time+N×ONU ranging time, where N is the number of ONUs accessing a PON OLT.

It can be seen according to the formula of the service interruption time that, time for performing ranging on an ONU again directly constrains the service interruption time. It can be known from the above description that, time for performing ranging on each ONU is about 1 ms. The more the number of ONUs accessing a PON port is, the longer the interruption time of a bearer service after active-standby OLT switching is. Generally, the service interruption time caused by active-standby switching is required to be less than 50 ms, and if 64 or more ONUs access a PON port, the service interruption time greatly exceeds the requirement of 50 ms. Moreover, capacity expansion is an inevitable trend for PON development, and as the number of ONUs accessing a PON is greatly increased, when ranging is required to be performed again in the service operation procedure, for services with high service delay requirements, such as a TDM (Time Division Multiplex, time division multiplex) voice service and a video service, the switching protection method in the prior art cannot satisfy their delay requirements.

However, after the embodiment of the present disclosure is adopted, the service interruption time caused in the switching protection procedure may be controlled about 3 ms, thereby satisfying the requirement of the service interruption time being less than 50 ms, and being applicable to multiple services with high service delay requirements.

The methods corresponding to Embodiment 1, Embodiment 2, and Embodiment 3 are compared comprehensively, comparison with the service interruption time in the prior art can be obtained, and details are shown in the following table:

| Branch ratio (the number of ONUs) | Service interruption time in the prior art | Service interruption time in the unicast manner in the present disclosure | Service interruption time in the multicast/broadcast manner in the present disclosure |
|---|---|---|---|
| 64 | 66 ms | 27.6 ms | 3 ms |
| 128 | 130 ms | 53.2 ms | 3 ms |
| 256 | 258 ms | 104.4 ms | 3 ms |

To sum up, the embodiments of the present disclosure adopting the multicast/broadcast manner achieve the following advantages. 1. The service interruption time is constant, and does not vary with the change in the number of the optical terminal apparatuses; and the service interruption time is only about 3 ms, far less than 50 ms, so that the embodiments are applicable to many services with high service delay requirements. 2. For the method according to the present disclosure in which the standby optical central office end apparatus delivers the ΔEqD/ΔRtd to all the optical terminal apparatuses in a multicast/broadcast manner, compared with other methods according to the present disclosure, only the first EqD/Rtd value of the ranging optical terminal apparatus is required to be obtained, and the first EqD/Rtd value of a non-ranging optical terminal apparatus is not required to be obtained, so the amount of synchronizing information data between the active optical central office end apparatus and the standby optical central office end apparatus is the least.

Embodiment 4

Figure 7:
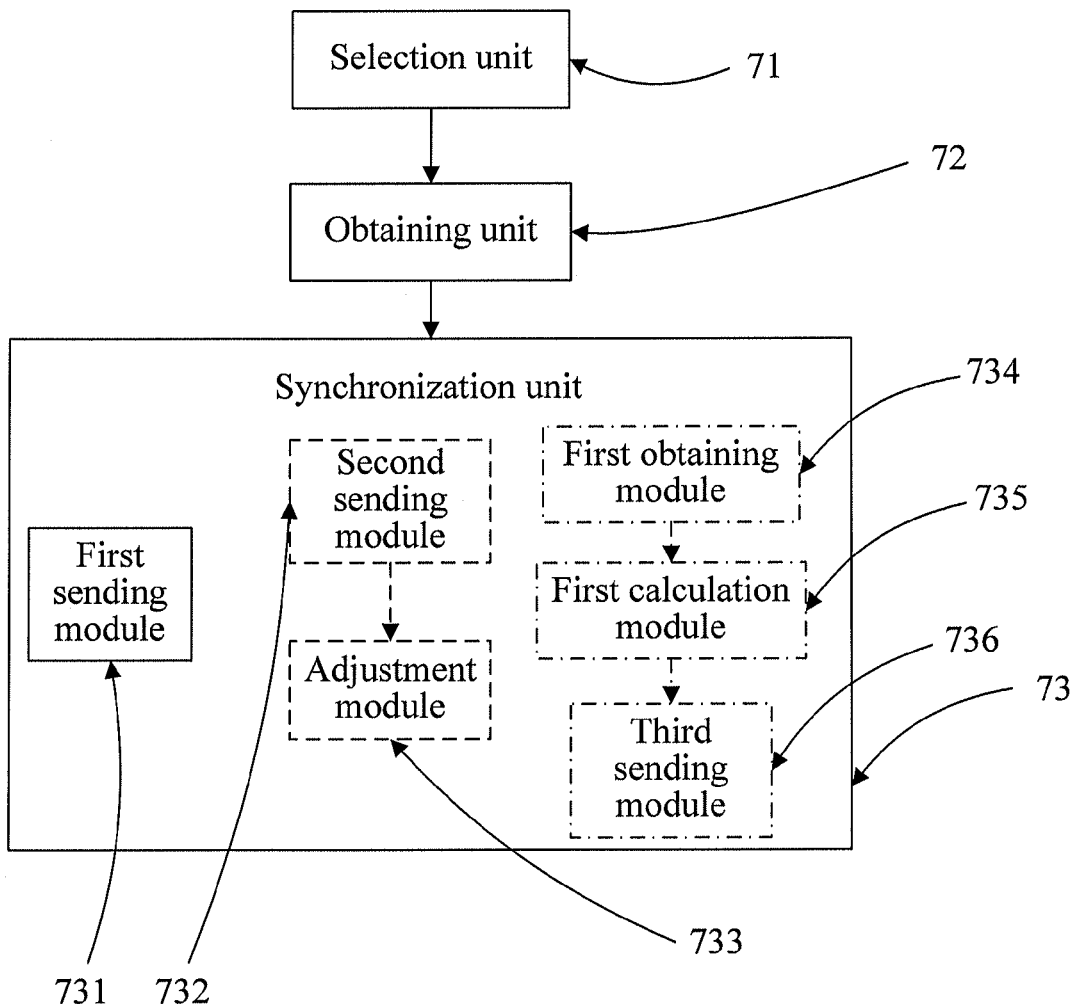
FIG. 7 is a block diagram of an optical central office end apparatus according to Embodiment 4 of the present disclosure.

The embodiment of the present disclosure further provides an optical central office end apparatus, which is configured to implement the methods according to the embodiments of the present disclosure. As shown in FIG. 7, the optical central office end apparatus includes: a selection unit 71, an obtaining unit 72, and a synchronization unit 73.

The selection unit 71 is configured to select one of all optical terminal apparatuses as a ranging optical terminal apparatus after a service is switched from an active optical central office end apparatus to a standby optical central office end apparatus. The obtaining unit 72 is configured to obtain a delay difference between delay from the ranging optical terminal apparatus to the standby optical central office end apparatus and delay from the ranging optical terminal apparatus to the active optical central office end apparatus. The synchronization unit 73 is configured to synchronize time at which data sent by all the optical terminal apparatuses reaches the standby optical central office end apparatus according to the delay difference.

The implementation of each unit is further illustrated in detail in the following, and the synchronization unit 73 includes, but is not limited to, the following three implementation manners.

First implementation manner: As shown in FIG. 7, the synchronization unit 73 includes a first sending module 731. The first sending module 731 is configured to deliver the delay difference to all the optical terminal apparatuses; and instruct each optical terminal apparatus to calculate EqD between the optical terminal apparatus and the standby optical central office end apparatus according to the delay difference respectively, and set the calculated EqD.

The manner in which the optical terminal apparatus calculates the EqD may vary due to different delay difference types, and the following examples are provided for illustration.

If the delay difference is an EqD difference, the optical terminal apparatus adds the EqD difference to an EqD between the optical terminal apparatus and the active optical central office end apparatus to obtain the EqD between the optical terminal apparatus and the standby optical central office end apparatus.

If the delay difference is an Rtd difference, and the first Teqd under the active optical central office end apparatus is equal to the second Teqd under the standby optical central office end apparatus, each optical terminal apparatus adds the Rtd difference to the EqD between each optical terminal apparatus and the active optical central office end apparatus to obtain the EqD between the optical terminal apparatus and the standby optical central office end apparatus.

If the delay difference is the Rtd difference, and first Teqd under the active optical central office end apparatus is not equal to second Teqd under the standby optical central office end apparatus, the first sending module 731 is further configured to deliver the first Teqd under the active optical central office end apparatus and the second Teqd under the standby optical central office end apparatus to all the optical terminal apparatuses in a multicast/broadcast manner; and each optical terminal apparatus adds the Rtd difference, and adds a difference between the first Teqd and the second Teqd to the EqD between the optical terminal apparatus and the active optical central office end apparatus to obtain the EqD between the optical terminal apparatus and the standby optical central office end apparatus.

Second implementation manner: As shown by dashed lines in FIG. 7, the synchronization unit 73 includes: a second sending module 732 and an adjustment module 733. The second sending module 732 is configured to send a message to instruct all the optical terminal apparatuses to maintain the original EqD unchanged in a multicast/broadcast/unicast manner. The adjustment module 733 is configured to adjust start time of an uplink frame header of each optical terminal apparatus according to time denoted by the delay difference.

Specifically, the second sending module 732 may bear an instruction message in a unicast manner into a multicast/broadcast channel and deliver the instruction message to all the optical terminal apparatuses, so as to instruct all the optical terminal apparatuses to maintain the original EqD unchanged; or the second sending module 732 modifies the instruction message in the unicast manner into a multicast/broadcast message and delivers the multicast/broadcast message to all the optical terminal apparatuses, so as to instruct all the optical terminal apparatuses to maintain the original EqD unchanged.

If the obtaining unit 72 further obtains first EqD between each optical terminal apparatus and the active optical central office end apparatus, the second sending module 732 may further deliver the corresponding first EqD to each optical terminal apparatus in the multicast/broadcast/unicast manner respectively to instruct the optical terminal apparatus to maintain the original EqD unchanged.

If the obtaining unit 72 further obtains first Rtd between each optical terminal apparatus and the active optical central office end apparatus, and calculates corresponding first EqD by utilizing the first Rtd, the second sending module 732 may further deliver the corresponding first EqD to each optical terminal apparatus in the multicast/broadcast/unicast manner respectively to instruct the optical terminal apparatus to maintain the original EqD unchanged.

Third implementation manner: As shown by dotted lines in FIG. 7, the synchronization unit 73 includes: a first obtaining module 734, a first calculation module 735, and a third sending module 736. The first obtaining module 734 is configured to obtain the first Rtd between each optical terminal apparatus and the active optical central office end apparatus. The first calculation module 735 is configured to calculate according to a formula $EqD_n = Teqd - [Rtd_n - \Delta Rtd]$, where $EgD_n$ denotes second EqD between any one of the optical terminal apparatuses and the standby optical central office end apparatus, Teqd denotes second Teqd under the standby optical central office end apparatus, $Rtd_n$ denotes first Rtd between any one of the optical terminal apparatuses and the active optical central office end apparatus, and $\Delta Rtd$ denotes a difference between Rtd from the ranging optical terminal apparatus to the standby optical central office end apparatus and Rtd from the ranging optical terminal apparatus to the active optical central office end apparatus. The third sending module 736 is configured to send the calculated second EqD to the corresponding optical terminal apparatus respectively in a multicast/broadcast manner, and instruct each optical terminal apparatus to respectively set the calculated EqD.

The obtaining unit 72 may adopt, but not limited to, the following two implementation manners.

First implementation manner: The obtaining unit 72 obtains first Rtd between the ranging optical terminal apparatus and the active optical central office end apparatus from the active optical central office end apparatus; performs ranging on the ranging optical terminal apparatus to obtain second Rtd between the ranging optical terminal apparatus and the standby optical central office end apparatus; and then calculates an Rtd difference according to the first Rtd and the second Rtd.

Second implementation manner: The obtaining unit 72 obtains first EqD between the ranging optical terminal apparatus and the active optical central office end apparatus from the active optical central office end apparatus, or reads the first EqD between the ranging optical terminal apparatus and the active optical central office end apparatus obtained in advance from the active optical central office end apparatus; performs ranging on the ranging optical terminal apparatus to obtain the second Rtd between the ranging optical terminal apparatus and the standby optical central office end apparatus; and then calculates a second EqD between the ranging optical terminal apparatus and the standby optical central office end apparatus according to the second Rtd, and calculates an EqD difference according to the first EqD and the second EqD.

After the embodiments of the present disclosure are adopted, ranging is only required to be performed on the ranging optical terminal apparatus, compared with the solution in the prior art that ranging is required to be performed on all the optical terminal apparatuses again, the embodiments of the present disclosure can shorten the time for ranging. Therefore, all the optical terminal apparatuses can quickly achieve synchronization under the standby optical central office end apparatus, that is, the data sent by all the optical terminal apparatuses reaches the standby optical central office end apparatus at the same time, so that service transmission between the optical terminal apparatuses and the optical central office end apparatus is easily restored, thereby shortening the service interruption time caused by fault protection. Accordingly, service continuity is ensured, which brings good experience to a user, and improves satisfaction of the user for services provided by an operator.

In the foregoing embodiments, the optical terminal apparatus may be an ONT or ONU, and the optical central office end apparatus may be an OLT or other optical central office end apparatuses.

The embodiments of the present disclosure are mainly applied to an optical communication system, and particularly to an optical communication system where an OLT is required to perform signal synchronization processing.

Through the foregoing description of the embodiments, it is apparent to persons skilled in the art that the present disclosure may be accomplished by software plus necessary universal hardware, and definitely may also be accomplished by hardware, but in most cases, the present disclosure is preferably implemented through the former method. Based on this, the technical solutions of the present disclosure or the part that makes contributions to the prior art can be substantially embodied in the form of a software product. The computer software product may be stored in a readable storage medium, for example, a floppy disk, a hard disk, or an optical disk of the computer, and contain several instructions used to instruct a computer device (for example, a personal computer, a server, or a network device) to perform the method according to the embodiments of the present disclosure.

The foregoing descriptions are merely exemplary embodiments of the present disclosure, but are not intended to limit the claims. Various modifications and variations made by persons skilled in the art to the disclosed embodiments shall fall within the scope of the claims.

What is claimed is:

1. A method for optical network switching protection, comprising:
    selecting, by a standby optical central office end apparatus, one optical terminal apparatus as a ranging optical terminal apparatus after a service is switched from an active optical central office end apparatus to the standby optical central office end apparatus;
    obtaining, by the standby optical central office end apparatus, a delay difference between a delay from the ranging optical terminal apparatus to the standby optical central office end apparatus and a delay from the ranging optical terminal apparatus to the active optical central office end apparatus;
    delivering, by the standby optical central office end apparatus, the delay difference to all optical terminal apparatuses in a multicast manner, so that each optical terminal apparatus calculates Equalization delay (EqD) between the optical terminal apparatus and the standby optical central office end apparatus according to the delay difference respectively, and sets the calculated EqD; and
    synchronizing, by the standby optical central office end apparatus, a time at which data sent by all the optical terminal apparatuses reaches the standby optical central office end apparatus according to the delay difference.

2. The method for optical network switching protection according to claim 1, wherein
if the delay difference is an EqD difference, calculating, by each optical terminal apparatus the EqD between the optical terminal apparatus and the standby optical central office end apparatus according to the delay difference respectively comprises:
adding the EqD difference to an EqD between the optical terminal apparatus and the active optical central office end apparatus to obtain the EqD between the optical terminal apparatus and the standby optical central office end apparatus;
if the delay difference is a Round trip delay (Rtd) difference, calculating, by each optical terminal apparatus, the EqD between the optical terminal apparatus and the standby optical central office end apparatus according to the delay difference respectively comprises:
adding the Rtd difference to the EqD between the optical terminal apparatus and the active optical central office end apparatus to obtain the EqD between the optical terminal apparatus and the standby optical central office end apparatus;
if the delay difference is the Rtd difference, and a first Equalized Rtd (Teqd) under the active optical central office end apparatus is not equal to a second Teqd under the standby optical central office end apparatus, the method further comprises:
delivering, by the standby optical central office end apparatus, the first Teqd under the active optical central office end apparatus and the second Teqd under the standby optical central office end apparatus to all the optical terminal apparatuses in a multicast manner; and
calculating, by each optical terminal apparatus, the EqD between the optical terminal apparatus and the standby optical central office end apparatus according to the delay difference respectively comprises: adding the Rtd difference, and adding a difference between the first Teqd and the second Teqd to the EqD between the optical terminal apparatus and the active optical central office end apparatus to obtain the EqD between the optical terminal apparatus and the standby optical central office end apparatus.

3. The method for optical network switching protection according to claim 2, wherein the first Teqd and the second Teqd are pre-configured in the standby optical central office end apparatus, or are obtained by the standby optical central office end apparatus from the active optical central office end apparatus.

4. The method for optical network switching protection according to claim 1, wherein the synchronization of the time at which the data sent by all the optical terminal apparatuses reaches the standby optical central office end apparatus according to the delay difference comprises:
instructing, by the standby optical central office end apparatus, all the optical terminal apparatuses to maintain the original EqD unchanged in a multicast manner; and
adjusting, by the standby optical central office end apparatus, a start time of an uplink frame header of each optical terminal apparatus according to time denoted by the delay difference.

5. The method for optical network switching protection according to claim 1, wherein synchronization of the time at which the data sent by all the optical terminal apparatuses reaches the standby optical central office end apparatus according to the delay difference comprises:
obtaining, by the standby optical central office end apparatus, a first Rtd between each optical terminal apparatus and the active optical central office end apparatus;
calculating, by the standby optical central office end apparatus, according to a formula $EqD_n=Teqd-[Rtd_n-\Delta Rtd]$, wherein $EqD_n$ denotes second EqD between any one of the optical terminal apparatuses and the standby optical central office end apparatus, Teqd denotes second Teqd under the standby optical central office end apparatus, $Rtd_n$ denotes first Rtd between any one of the optical terminal apparatuses and the active optical central office end apparatus, and $\Delta Rtd$ denotes a difference between Rtd from the ranging optical terminal apparatus to the standby optical central office end apparatus and Rtd from the ranging optical terminal apparatus to the active optical central office end apparatus; and
sending, by the standby optical central office end apparatus, the calculated second EqD to the corresponding optical terminal apparatus respectively in a multicast/broadcast manner, and instructing each optical terminal apparatus to respectively set the calculated EqD.

6. The method for optical network switching protection according to claim 1, wherein the delay difference is a difference between the Rtd from the ranging optical terminal apparatus to the standby optical central office end apparatus and the Rtd from the ranging optical terminal apparatus to the active optical central office end apparatus; or the delay difference is a difference between the EqD from the ranging optical terminal apparatus to the standby optical central office end apparatus and the EqD from the ranging optical terminal apparatus to the active optical central office end apparatus.

7. A system for optical network switching protection, comprising:
an active optical central office end apparatus;
a standby optical central office end apparatus; and
at least one optical terminal apparatus, wherein
the standby optical central office end apparatus is configured to select one optical terminal apparatus as a ranging optical terminal apparatus after a service is switched from the active optical central office end apparatus to the standby optical central office end apparatus; obtain a delay difference between a delay from the ranging optical terminal apparatus to the standby optical central office end apparatus and a delay from the ranging optical terminal apparatus to the active optical central office end apparatus; deliver the delay difference to all optical terminal apparatuses in a multicast manner; and synchronize time at which data sent by all the optical terminal apparatuses reaches the standby optical central office end apparatus according to the delay difference; and
the optical terminal apparatus is configured to send the data to the standby optical central office end apparatus after the service is switched from the active optical central office end apparatus to the standby optical central office end apparatus and calculate an Equalization delay (EqD) between the optical terminal apparatus and the standby optical central office end apparatus according to the delay difference respectively, and set the calculated EqD.

8. The system for optical network switching protection according to claim 7, wherein
if the delay difference is an EqD difference, each optical terminal apparatus adds the EqD difference to an EqD between the optical terminal apparatus and the active optical central office end apparatus to obtain the EqD between the optical terminal apparatus and the standby optical central office end apparatus;

if the delay difference is a Round trip delay (Rtd) difference, each optical terminal apparatus adds the Rtd difference to the EqD between the optical terminal apparatus and the active optical central office end apparatus to obtain the EqD between the optical terminal apparatus and the standby optical central office end apparatus; and if the delay difference is the Rtd difference, and a first Equalized Rtd (Teqd) under the active optical central office end apparatus is not equal to a second Teqd under the standby optical central office end apparatus, the standby optical central office end apparatus is further configured to deliver the first Teqd under the active optical central office end apparatus and the second Teqd under the standby optical central office end apparatus to all the optical terminal apparatuses in a multicast manner; and each optical terminal apparatus adds the Rtd difference, and adds a difference between the first Teqd and the second Teqd to the EqD between the optical terminal apparatus and the active optical central office end apparatus to obtain the EqD between the optical terminal apparatus and the standby optical central office end apparatus.

9. The system for optical network switching protection according to claim 8, wherein the first Teqd and the second Teqd are pre-configured in the standby optical central office end apparatus, or the standby optical central office end apparatus obtains the first Teqd and the second Teqd from the active optical central office end apparatus.

10. The system for optical network switching protection according to claim 8, wherein when the standby optical central office end apparatus synchronizes the time at which the data sent by all the optical terminal apparatuses reaches the standby optical central office end apparatus according to the delay difference, the standby optical central office end apparatus is further configured to instruct all the optical terminal apparatuses to maintain the original EqD unchanged in a multicast manner, and adjust start time of an uplink frame header of each optical terminal apparatus according to time denoted by the delay difference.

11. The system for optical network switching protection according to claim 8, wherein when the standby optical central office end apparatus synchronizes the time at which the data sent by all the optical terminal apparatuses reaches the standby optical central office end apparatus according to the delay difference, the standby optical central office end apparatus is further configured to obtain an Rtd between each optical terminal apparatus and the active optical central office end apparatus; calculate according to a formula $EqD_n = Teqd - [Rtd_n - \Delta Rtd]$, wherein $EqD_n$ denotes EqD between any one of the optical terminal apparatuses and the standby optical central office end apparatus, Teqd denotes second Teqd under the standby optical central office end apparatus, $Rtd_n$ denotes first Rtd between any one of the optical terminal apparatuses and the active optical central office end apparatus, and $\Delta Rtd$ denotes a difference between Rtd from the ranging optical terminal apparatus to the standby optical central office end apparatus and Rtd from the ranging optical terminal apparatus to the active optical central office end apparatus; and send the calculated EqD to the corresponding optical terminal apparatus respectively in a multicast manner, and instruct each optical terminal apparatus to respectively set the calculated EqD.

12. An optical central office end apparatus, comprising:

a selection unit configured to select one of all optical terminal apparatuses as a ranging optical terminal apparatus after a service is switched from an active optical central office end apparatus to a standby optical central office end apparatus;

an obtaining unit configured to obtain a delay difference between a delay from the ranging optical terminal apparatus to the standby optical central office end apparatus and a delay from the ranging optical terminal apparatus to the active optical central office end apparatus; and a synchronization unit configured to synchronize time at which data sent by all the optical terminal apparatuses reaches the standby optical central office end apparatus according to the delay difference;

wherein the synchronization unit comprises:

a first sending module configured to deliver the delay difference to all optical terminal apparatuses in a multicast manner; and instruct each optical terminal apparatus to calculate Equalization delay (EqD) between the optical terminal apparatus and the standby optical central office end apparatus according to the delay difference respectively, and set the calculated EqD.

13. The optical central office end apparatus according to claim 12, wherein if the delay difference is an EqD difference, the optical terminal apparatus adds the EqD difference to an EqD between the optical terminal apparatus and the active optical central office end apparatus to obtain the EqD between the optical terminal apparatus and the standby optical central office end apparatus;

if the delay difference is a Round trip delay (Rtd) difference, each optical terminal apparatus adds the Rtd difference to the EqD between each optical terminal apparatus and the active optical central office end apparatus to obtain the EqD between the optical terminal apparatus and the standby optical central office end apparatus;

if the delay difference is the Rtd difference, and first Equalized Rtd (Teqd) under the active optical central office end apparatus is not equal to second Teqd under the standby optical central office end apparatus, the sending module is further configured to deliver the first Teqd under the active optical central office end apparatus and the second Teqd under the standby optical central office end apparatus to all the optical terminal apparatuses in a multicast manner; and each optical terminal apparatus adds the Rtd difference, and adds a difference between the first Teqd and the second Teqd to the EqD between the optical terminal apparatus and the active optical central office end apparatus to obtain the EqD between the optical terminal apparatus and the standby optical central office end apparatus.

14. The optical central office end apparatus according to claim 12 wherein the synchronization unit comprises:

a second sending module configured to send a message to instruct all the optical terminal apparatuses to maintain the original EqD unchanged in a multicast manner; and an adjustment module configured to adjust start time of an uplink frame header of each optical terminal apparatus according to time denoted by the delay difference.

15. The optical central office end apparatus according to claim 12, wherein the synchronization unit comprises:

a first obtaining module configured to obtain first Rtd between each optical terminal apparatus and the active optical central office end apparatus;

a first calculation module, configured to calculate according to a formula $EqD_n = Teqd - [Rtd_n - \Delta Rtd]$, wherein $EqD_n$ denotes second EqD between any one of the optical terminal apparatuses and the standby optical central office end apparatus, Teqd denotes second Teqd under the standby optical central office end apparatus, $Rtd_n$ denotes first Rtd between any one of the optical terminal apparatuses and the active optical central office end apparatus, and ΔRtd denotes a difference between Rtd from the ranging optical terminal apparatus to the standby optical central office end apparatus and Rtd from the ranging optical terminal apparatus to the active optical central office end apparatus; and a third sending module, configured to send the calculated second EqD to the corresponding optical terminal apparatus respectively in a multicast/broadcast manner, and instruct each optical terminal apparatus to respectively set the calculated EqD.

\* \* \* \* \*